US 6,640,188 B2

(12) United States Patent
Hashida

(10) Patent No.: US 6,640,188 B2
(45) Date of Patent: Oct. 28, 2003

(54) CAR NAVIGATION APPARATUS CAPABLE OF DETERMINING ENTRY INTO PARKING AREA

(75) Inventor: Masaya Hashida, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/140,569

(22) Filed: May 7, 2002

(65) Prior Publication Data

US 2002/0169552 A1 Nov. 14, 2002

(30) Foreign Application Priority Data

May 8, 2001 (JP) ........................................ 2001-137569

(51) Int. Cl.$^7$ .............................................. G01S 21/00
(52) U.S. Cl. ........................ 701/213; 701/207; 340/990; 340/995
(58) Field of Search ................................ 701/207, 213, 701/216, 200; 340/990, 995

(56) References Cited

U.S. PATENT DOCUMENTS 5,648,904 A * 7/1997 Scott .......................... 701/117
6,265,968 B1 * 7/2001 Betzitza et al. ............. 340/436
6,453,235 B1 * 9/2002 Endo et al. .................. 701/211

OTHER PUBLICATIONS

Japanese Patent Kokai No. 10-307036 (English translation of the abstract attached).
Japanese Patent Kokai No. 10-307037 (English translation of the abstract attached).
Japanese Patent Kokai No. 8-11170 (English translation of the abstract attached).

* cited by examiner

Primary Examiner—Marthe Y. Marc-Coleman
(74) Attorney, Agent, or Firm—Perman & Green, LLP

(57) ABSTRACT

A car navigation apparatus for determining entry/exit of a vehicle into/from a parking area based on a running state of the vehicle without using a dedicated parking area database. Upon entry into a parking area, the entry is determined by totally checking the speed of the vehicle, the presence or absence of turn-round motion, an error in a forward and backward direction of the vehicle, estimated by map matching, the presence or absence of front and rear intersections, and the widths of intersecting roads. On the other hand, upon exit from a parking area, the exit is determined by totally judging the detected speed of the vehicle, the presence or absence of a straight running distance, the presence or absence of a nearby road extending in parallel with the course of the vehicle, and the width of the parallelly extending road.

11 Claims, 5 Drawing Sheets

DETERMINATION OF ENTRY INTO PARKING AREA

DETERMINATION OF EXIT FROM PARKING AREA

CAR NAVIGATION APPARATUS CAPABLE OF DETERMINING ENTRY INTO PARKING AREA

BACKGROUND OF THE INVENTION

1. Field of the Invention

The present invention relates to a car navigation apparatus capable of detecting a current position of a vehicle.

2. Description of Related Art

Car navigation apparatuses having a structure in which a storage medium such as a CD-ROM and the like is used for storing map data including road information produced by evaluating respective points on roads on maps are already known. In such apparatuses, while detecting a current position and heading direction of a vehicle, map data of a predetermined area including the current position is read from the storage medium to display a map around the current position of the vehicle on a display, and the current position and heading of the vehicle are automatically displayed.

Positioning methods used in such navigation apparatuses are generally classified into a self-contained navigation method which only uses information from sensors provided in a vehicle for measuring a variety of parameters such as a speed, heading and the like to measure a current position of the vehicle, and a navigation method relying on a navigation assisting system using GPS (Global Positioning System) (hereinafter simply called "GPS navigation method") which receives positioning data transmitted from a plurality of artificial satellites to measure a current position.

Since these two navigation methods each have their respective advantages and disadvantages, car navigation apparatuses generally employ a so-called hybrid navigation system which combines these navigation methods to compare respective measured data to perform the positioning process.

In addition, the car navigation apparatuses generally employ the so-called map matching processing for improving the accuracy of results of the positioning provided by these navigation methods and for matching the positioning results with map data, wherein if a current position of a vehicle is detected out of a road included in map data, the position is forcedly moved onto the road (for example, Japanese Patent Kokai No. 10-307037).

Since the conventional car navigation apparatuses experience difficulties in determining entry and exit of a vehicle into and from a parking area, there have been such problems as mismatching of the current position of a vehicle to a nearby road when the vehicle has entered a parking area, a delay in map matching operation upon exit from a parking area.

Such problems may be solved, for example, by building a database of map data including parking areas. However, unlike roads, parking areas are mostly managed and operated by individuals or private companies, and there are an immense number of parking areas. It is therefore extremely difficult to locate all parking areas to create a database. In addition, even if a database is once created, parking areas may often be built or demolished in a short term due to civil and construction works such as construction of buildings, land recovery, and the like, causing difficulties in correctly maintaining and managing the database.

OBJECT AND SUMMARY OF THE INVENTION

The present invention has been made to solve the problem mentioned above, and it is an object of the invention to provide a car navigation apparatus which determines entry and exit of a vehicle into and from a parking area from a running state of the vehicle without using dedicated map data including parking areas.

The present invention provides a car navigation apparatus for determining a current position of a vehicle on map data based on at least one parameter of self-contained navigation parameters and navigation parameters received using GPS. The car navigation apparatus includes a turn-round detecting part for detecting a turn-round motion of the vehicle to generate a turn-round signal; an out-of-intersection detecting part for generating an out-of-intersection signal as long as the current position is out of an intersection; and a parking area entry determining part responsive to the turn-round signal generated when the out-of-intersection signal exists for determining that the vehicle enters into a parking area to generate a parking area entry signal.

The car navigation apparatus of the present invention may include parking area exit determining means for detecting entry of the vehicle into a road region near the current position while the parking area entry signal exists to generate a parking area exit signal.

DETAILED DESCRIPTION OF THE EMBODIMENTS

In the following, one embodiment of the present invention will be described in detail with reference to the drawings.

Figure 1:
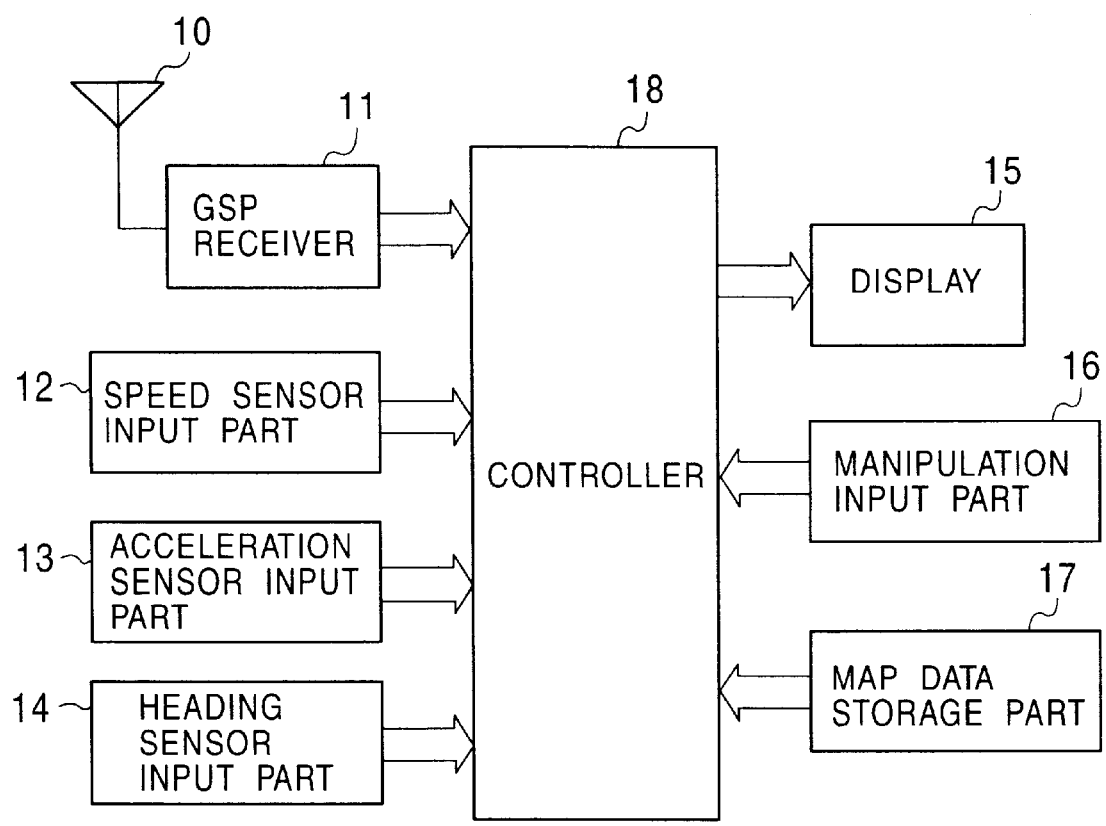
FIG. 1 is a block diagram generally illustrating the configuration of a car navigation apparatus according to one embodiment of the present invention.

FIG. 1 is a block diagram generally illustrating the configuration of a car navigation apparatus according to the present invention. The car navigation apparatus comprises, as illustrated in FIG. 1, an antenna 10; a GPS receiver 11; a speed sensor input part 12; an acceleration sensor input part 13; a heading sensor input part 14; a display 15; a manipulation input part 16; a map data storage part 17; and a controller 18.

The antenna 10, which may be a small high gain antenna, for example, a plane antenna, a helical antenna or the like, receives radio waves from a plurality of GPS satellites, and supplies the received radio waves to the GPS receiver 11. The GPS receiver 11, which is mainly comprises of a receiver for spread spectrum communications using a DS (Direct Sequence) scheme, detects and demodulates received radio waves from the GPS satellites to acquire positioning data included in the radio waves, and calculates a current position and heading of a vehicle in accordance with the GPS navigation method based on the positioning data.

The speed sensor input part 12, acceleration sensor input part 13 and heading sensor input part 14 are comprised of sensors and interface circuits associated therewith for detecting a variety of parameters for self-contained navigation method, required for the self-contained navigation method.

For reference, the speed sensor input part 12 captures a vehicle speed pulse from a sensor, for example, a rotary encoder or the like to detect the speed of the vehicle. The acceleration sensor input part 13 captures information on a change in pressure from an acceleration sensor which utilizes, for example, the inertia of a diaphragm or the like to detect an acceleration applied to the vehicle. The heading sensor input part 14 captures heading information from a heading sensor using a gyro mechanism, for example, a gimbal or the like to detect the heading of the vehicle.

The display 15, which is comprised of a display panel such as a liquid crystal, an organic EL (electroluminescence) or the like, and an interface circuit associated therewith, displays navigation information such as map data, a current position of the vehicle, and the like to the user. The manipulation input part 16, which is comprised of input manipulation keys such as numeral keys, a variety of touch switches, and the like, and an interface circuit associated therewith, receives manipulation inputs by the user to the car navigation apparatus.

The map data storage part 17, which is mainly comprised of a driving device for a recording medium such as a DVD, a CD-ROM or the like, reads information data such as map data which is previously recorded on the recording medium. The map data includes data such as road information relating to routes of roads, widths of roads, and the like, as well as position information such as intersections of roads, and the like.

The controller 18 is mainly comprised of a microcomputer (hereinafter simply referred to as "$\mu$CPU"), and a memory device such as a ROM (Read Only Memory), a RAM (Random Access Memory), and the like. The $\mu$CPU executes step by step a main routine program and a variety of subroutine programs stored in these memories in synchronism with an internal clock. The controller 18 is connected to each of the GPS receiver 11, speed sensor input part 12, acceleration sensor input part 13, heading sensor input part 14, display 15, manipulation input part 16, and map data storage part 17 for totally controlling the entire car navigation apparatus illustrated in FIG. 1.

Specifically, the controller 18 captures predetermined information from each of the GPS receiver 11, speed sensor input part 12, acceleration sensor input part 13 and heading sensor input part 14 every predetermined period in a process of executing the variety of programs, and totally analyzes such information to determine a current position, heading and the like of the vehicle.

The determination of the current position involves mixing data from the GPS navigation method and data from the self-contained navigation method, and modifying the data to determine the current position and heading of the vehicle. The processing associated with the positioning is disclosed in detail in Japanese Patent Kokai Nos. 8-11170 and 10-307036, so that description thereon will not be made here.

After performing the foregoing processing, the controller 18 displays a map around the current position of the vehicle on the display 15 based on the map information captured from the map data storage part 17, and executes a so-called own position display operation for displaying the current position and heading of the vehicle on the map.

Next, the parking area entry/exit determination processing, which is a feature of the present invention, will be described in the car navigation apparatus illustrated in FIG. 1.

Figure 2:
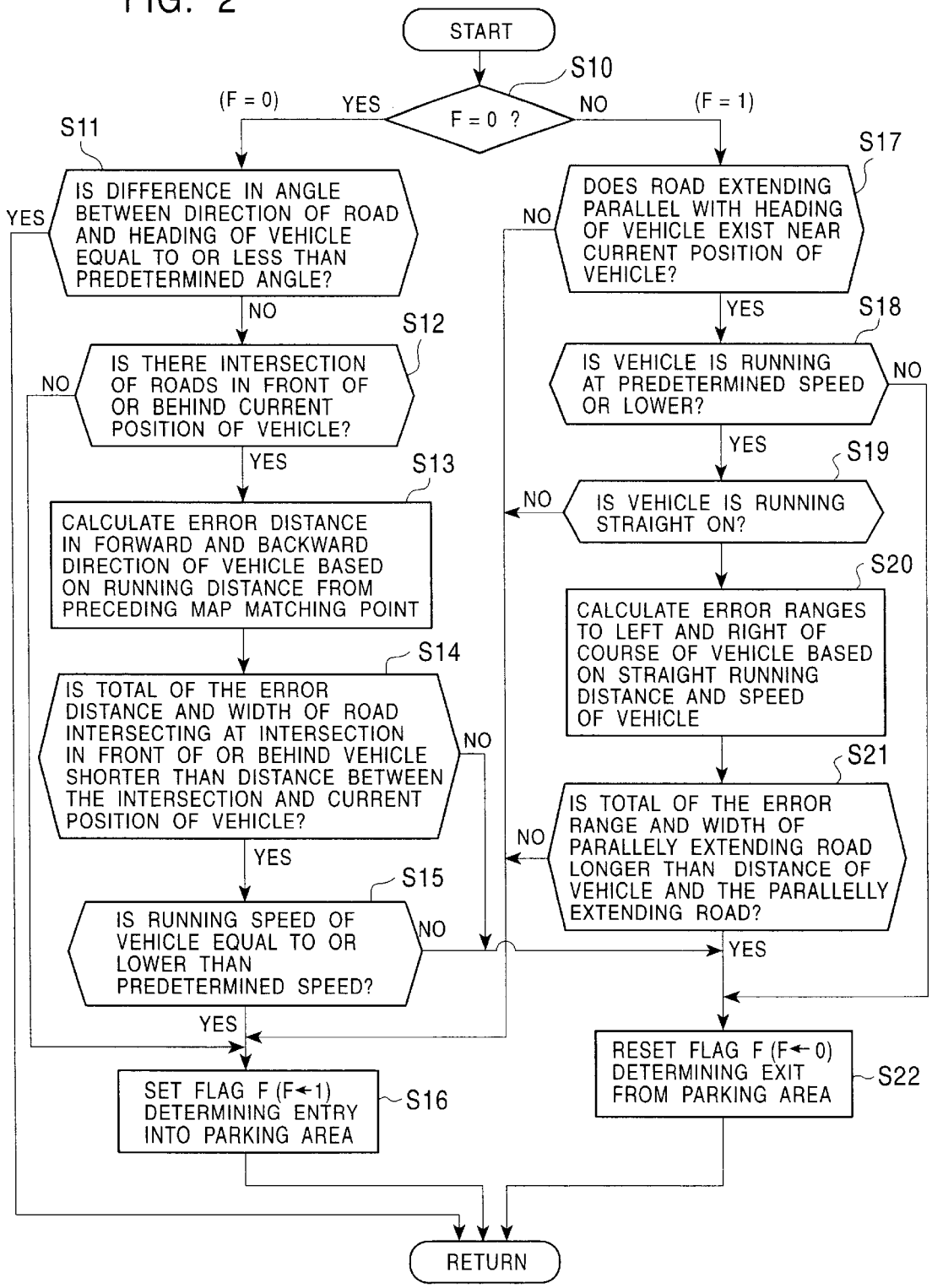
FIG. 2 is a flow chart illustrating parking area entry/exit determination processing in the car navigation apparatus of the embodiment.

FIG. 2 illustrates in flow chart form a subroutine program (hereinafter simply called the "subroutine" or "this subroutine") representing the parking area entry/exit determination processing. For reference, the subroutine illustrated in FIG. 2 is initiated each time the aforementioned map matching processing is performed in a main routine program (not shown) executed by the controller 18.

First, at the beginning of the subroutine in FIG. 2, the state of a flag F is determined (step 10). The flag F is held in one of registers provided, for example, in a cache memory, and is set to "1" at step 16, later described, upon determination of entry into a parking area when this subroutine is initiated in the preceding map matching processing, and reset to "0" at step 22 upon determination of exit from a parking area. The flag F has an initial value "0" in an initial state such as power-on of the car navigation apparatus.

If the determination result at step 10 indicates F=0, the controller 18 proceeds to step 11 on the assumption that the current position of the vehicle is out of a parking area.

At step 11, the controller 18 compares the heading of the vehicle captured from the heading sensor input part 14 with the direction of a road on which the vehicle is currently being matched on the map to determine whether or not a difference in angle between the heading of the vehicle and the direction of the road is equal to or less than a predetermined angle.

If the difference in angle is equal to or less than the predetermined angle at step 11, i.e., the course of the vehicle substantially matches the direction of the road, it is through that the vehicle is currently running favorably on the road on which it is matched on the map. In this case, therefore, the controller 18 determines that the vehicle is unlikely to admit into a parking area, and terminates this subroutine to return to the main routine with the flag F maintained at "0" (F=0: out of a parking area).

Figure 3:
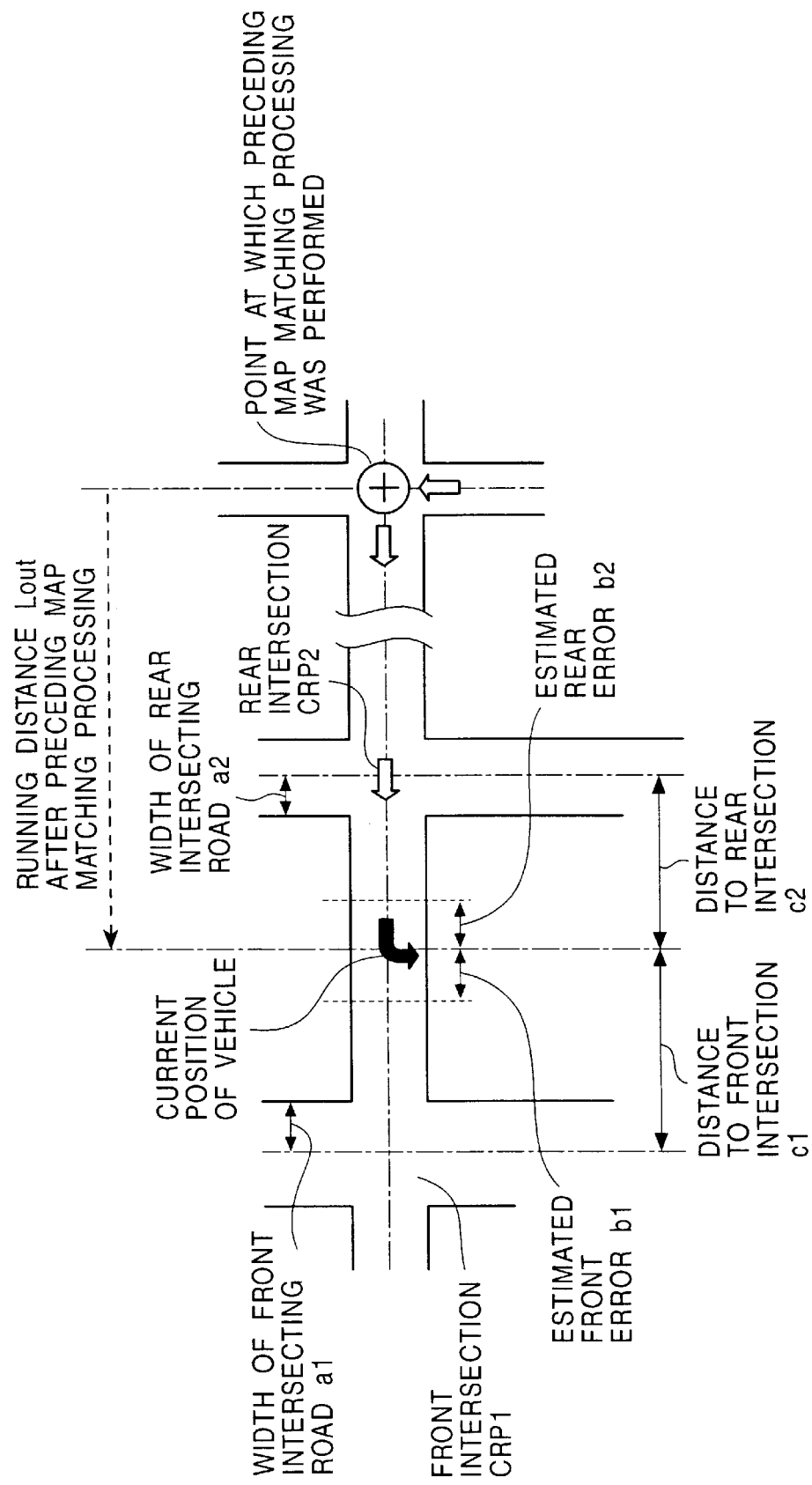
FIG. 3 is an explanatory diagram for parking area entry determination processing in the car navigation apparatus of the embodiment.

On the other hand, if it is determined at step 11 that the difference in angle between the course of the vehicle and the direction of the road is equal to or larger than the predetermined angle (this event is called the "turn-around"), it can be regarded that the vehicle is now performing a turn-around motion on a road, on which the vehicle is being matched on the map, as shown in an explanatory diagram for the parking entry determination processing in FIG. 3. Specifically, it is estimated that the vehicle is going to turn right or left at an intersection, or to admit into a parking area. To clarify this estimation, the controller 18 proceeds to next step 12.

At step 12, the controller 18 determines based on road information stored in the map data storage part 17 whether or not an intersection of roads exists in front of or behind the vehicle currently matched on the road.

If the controller 18 detects an intersection CRP1 in front of the current position of the vehicle, and an intersection CRP2 behind the vehicle, as shown in FIG. 3, the controller 18 proceeds to step 13 for again making a determination.

On the other hand, if the controller 18 cannot detect any intersection in front of or behind the current position of the vehicle, it is clear that the turn-round motion of the vehicle, detected at the aforementioned step 11, is intended to admit into a parking area. Thus, the controller 18 proceeds to step 18, where the flag F is set to "1," determining that the vehicle has admitted into a parking area, followed by termination of this subroutine.

At step 13, the controller 18 calculates an error distance for forward and backward directions at the current position of the vehicle based on a running distance of the vehicle from the preceding map matching point to the current position. Describing this step with reference to FIG. 3, a predetermined error calculation is performed on a running distance Lout from the preceding map matching point to calculate an estimated error distance b1 to the front of the vehicle, and an estimated error distance b2 to the rear. For reference, the map matching point refers to a location at which map matching processing is performed for matching road information included in map data with the current position of the vehicle, and is performed, for example, each time the vehicle passes an intersection of roads, or turns right or left, as shown in FIG. 3. The running distance Lout can be calculated by integrating vehicle speed information from the speed sensor input part 12 for the time from the preceding matching point to the current position.

At subsequent step 14, the controller 18 determines whether or not a total of the error distances calculated at the preceding step 13 and the widths of roads intersecting at the front and rear intersections detected at step 12 is shorter than the distance between each intersection and the current position of the vehicle.

Details on the processing at step 14 will be described with reference to the explanatory diagram for the entry determination processing in FIG. 3 and a detailed flow chart illustrated in FIG. 4.

Figure 4:
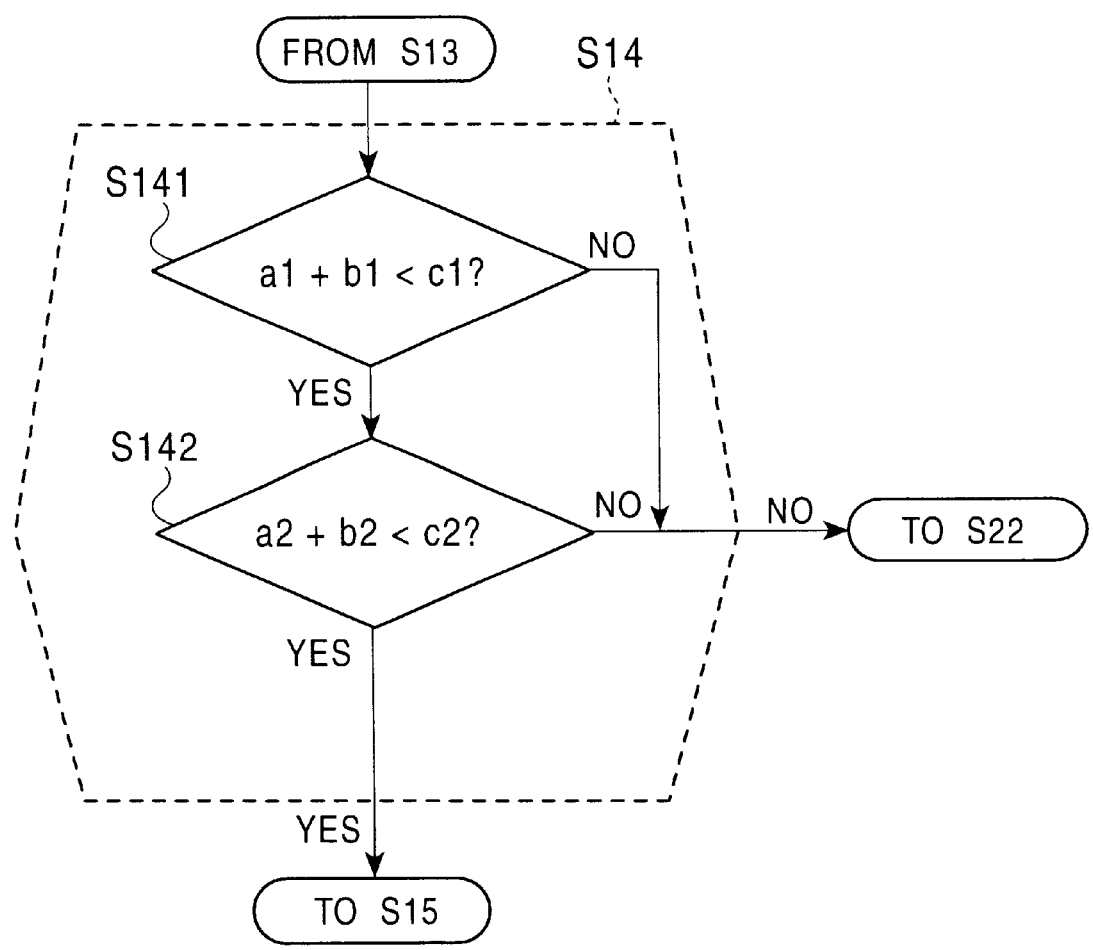
FIG. 4 is a detailed flow chart illustrating step 14 in the flow chart illustrated in FIG. 2 in greater detail.

In the detailed flow chart in FIG. 4, the controller 18 first finds a width a1 of a road intersecting at the front intersection CPR1 based on road information stored in the map data storage part 17. Then, the controller 18 determines whether or not a total distance of the estimated error distance b1 to the front of the vehicle calculated at step 13 and the width a1 is shorter than a distance c1 between the front intersection CRP1 and the current position of the vehicle (step 141).

If the controller 18 determines at step 141 that the following relationship is established:

$$a1+b1<c1$$

this means that the vehicle does not yet reach a region of the front intersection CRP1, as is also apparent from FIG. 3. Therefore, the turn-round motion of the vehicle detected at the aforementioned step 11 does not indicate at least a right turn operation or a left turn operation in the region of the front intersection CRP1. Therefore, the controller 18 proceeds to step 142 to analyze the turn-round motion of the vehicle.

At step 142, the controller 18 finds the width a2 of a road intersecting at the rear intersection CRP2 behind the vehicle, and determines whether or not a total distance of this value and the estimated error distance b2 to the rear of the vehicle calculated at the aforementioned step 13 is shorter than a distance c2 between the rear intersection CRP2 and the current position of the vehicle.

If the controller determines at step 142 that the following relationship is established:

$$a2+b2<c2$$

this means that the vehicle has completely left a region of the rear intersection CRP2. Therefore, the turn-round motion of the vehicle detected at the aforementioned step 11 does not indicate a right turn or a left turn in the region of the rear intersection CRP2.

In other words, in the detailed flowchart of step 14 illustrated in FIG. 4, if the determination results at steps 141 and 142 are both "YES," this means that the current position of the vehicle is sufficiently away from each of the front and rear intersections. Therefore, the turn-round motion of the vehicle does not indicate a right turn or a left turn in the intersections, but is probably intended to admit into a parking area by the road on which the vehicle is running. Thus, the controller 18 further proceeds to next step 15 to confirm this hypothesis.

On the other hand, if the determination result at step 141 or 142 indicates "NO," that is, $$a1+b1=c1$$

or $$a2+b2=c2$$

this can be interpreted that the vehicle is positioned within the region of the front intersection CRP1 or rear intersection CRP2, and the turn-round motion is a right or left turn operation in the intersection.

Therefore, the controller 18 determines that the motion of the vehicle is not intended to admit into a parking area, and proceeds to step 22, where the flag F is reset to "0" (out of a parking area), i.e., the state of the flag F is not changed, followed by termination of this subroutine.

At step 15, the controller 18 determines based on the vehicle speed data captured from the speed sensor input part 12 whether or not the running speed of the vehicle is equal to or lower than a predetermined speed. Upon determining that the vehicle speed is equal to or lower than the predetermined speed, the controller 18 determines that the turn-round motion of the vehicle detected at step 11 is intended to admit into a parking area, associated with a reduction in vehicle speed, i.e., slow running of the vehicle, and proceeds to step 16, where the flag F is set to "1" (within a parking area), followed by termination of this subroutine.

On the other hand, if the vehicle speed is equal to or higher than the predetermined speed at step 15, the controller 18 determines that even if the determination up to step 14 suggests entry into a parking area, the turn-round motion of the vehicle is involved, for example, in a change of lane other than that at an intersection, followed by a transition to step 22, where the flag F is maintained at "0" (out of a parking area), and this subroutine is terminated.

Next described is the parking area exit determination processing in this subroutine. Specifically, upon determining at step 10 at the beginning of this subroutine that the flag F is "1," the controller 18 proceeds to the next step 17 on the assumption that the current position of the vehicle is in a parking area.

At step 17, the controller 18 determines whether or not a road exists in parallel with the course of the vehicle near the current position of the vehicle based on vehicle heading data from the heading sensor input part 14, and road information stored in the map data storage part 17.

When no road in parallel with the course of the vehicle is detected near the current position of the vehicle at step 17, the controller 18 proceeds to step 16, estimating that the vehicle is still in the parking area, where the flag F is set to "1" (in the parking area), i.e., the state of flag (F=1) is not changed, followed by termination of this subroutine.

On the other hand, when a road in parallel with the course of the vehicle is detected near the current position of the vehicle, the controller 18 proceeds to the next step 18 to determine a running state of the vehicle at the current time based on input data from each of the speed sensor input part 12, acceleration sensor input part 13 and heading sensor input part 14.

Upon determining at step 18 that the vehicle is running at a predetermined speed or higher, it is estimated in view of the running state that the vehicle has exited the parking area and is running on an ordinary road at the predetermined speed or higher. Therefore, the controller 18 proceeds to step 22, where the flag F is reset to "0" (out of the parking area), followed by termination of this subroutine.

In this event, after the controller 18 returns from this subroutine to the main routine program (not shown), the map matching processing is again performed for establishing the current position of the vehicle on a road.

On the other hand, upon determining at step 18 that the vehicle is running at the predetermined speed or lower, the controller 18 proceeds to step 19 to determine whether or not the vehicle is running straight on based on data from the respective sensors.

Upon determining at step 19 that the vehicle is not running straight on, it is estimated that the vehicle is still in the parking area and is repeating a turn-round motion of a small radius involved in an operation for putting the vehicle into a garage, so that the controller 18 proceeds to step 16, where the flag F is set to "1" (in the parking area), i.e., the state of the flag F (F=1) is not changed, followed by termination of this subroutine.

On the other hand, upon determining at step 19 that the vehicle is running straight on, it can also be thought in view of the flow from the aforementioned step 18 that the vehicle is still running straight on within the parking area at a low speed. As such, the controller 18 proceeds to the next step 20 to confirm such a situation.

At step 20, the controller 18 calculates an error range to the left and right of the course of the vehicle based on the speed and straight running distance of the vehicle. This calculation is shown in a diagram of FIG. 5 for explaining the processing for determining exit from a parking area. Specifically, the controller 18 applies a predetermined error calculation to a straight running distance Lin, assumed within the parking area, calculated from data from the respective sensors to calculate an error range b3 to the left and right of the course.

At subsequent step 21, the controller 18 first finds a width a3 of a road which extends in parallel near the current position of the vehicle, from the road information stored in the map data storage part 17, and calculates an interval (distance) c3 between the road and the current position of the vehicle. Then, the controller 18 determines whether or not the sum of the error range b3 calculated at step 20 and the width a3 of the parallelly extending road is larger than the distance c3 between the parallelly extending road and the vehicle.

Figure 5:
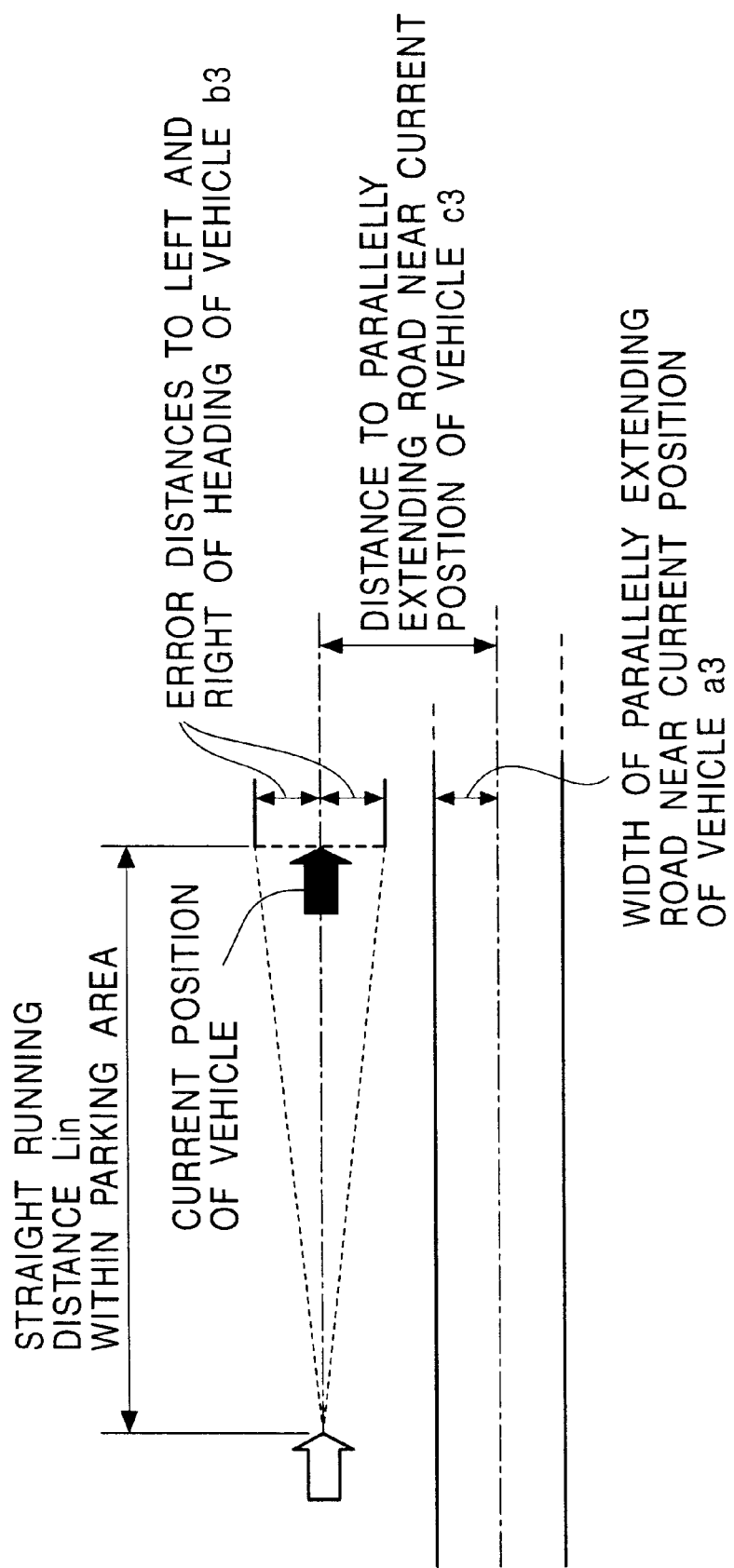
FIG. 5 is an explanatory diagram for parking area exit determination processing in the car navigation apparatus of the embodiment.

If the controller 18 determines at step 21:

$$a3+b3<c3$$

the vehicle is running straight on at a low speed equal to or lower than the predetermined speed out of the range of the parallelly extending road, when considering this state as applied to the explanatory diagram of FIG. 5.

Since this state is reasonably interpreted that the vehicle is running straight on at a low speed within a parking area, the controller 18 proceeds to step 16, where the flag F is maintained at "1" (within the parking area), followed by termination of this subroutine.

On the other hand, if the controller 18 determines at step 21:

$$a3b3 \geq c3$$

it is estimated that the vehicle has already left the parking area and entered a region of a parallelly extending road, and is running straight on at a low speed on the road.

Thus, the controller 18 proceeds to step 22, where the flag F is set to "0" (out of the parking area), followed by termination of this subroutine. It goes without saying that the map matching processing is also performed in this event to again establish the current position of the vehicle on the road after the controller 18 returns from the subroutine to the main routine program (not shown).

In the present invention, since the determination as to entry/exit of a vehicle into/from a parking area is made based on a running state of the vehicle, and ordinary road information data, it is not necessary to provide a special database for navigation, which additionally includes parking areas, in determining the entry/exit of a vehicle into/from a parking area.

In addition, since the determination as to entry/exit into/from a parking area is made on the basis of an intersection region, or a road region which extends in parallel with the course of the vehicle, in consideration of the width of the road, a correct determination can be made even when a vehicle is going to admit into or exit from an extremely small parking area, for example, a parking area of a convenience store located near an intersection. Furthermore, the map matching processing can be promptly performed for matching the vehicle on a road, on which it is running, after exit from a parking area, thereby making it possible to further improve the convenience of the car navigation.

This application is based on Japanese Patent Application No. 2001-137569 which is herein incorporated by reference.

What is claimed is:

1. A vehicle navigation apparatus for determining a current position of a vehicle on map data based on at least one parameter of self-contained navigation parameters and GPS received navigation parameters, said car navigation apparatus comprising:
    a turn-round detecting part for detecting a turn-round motion of the vehicle to generate a turn-round signal;
    an out-of-intersection detecting part for generating an out-of-intersection signal as long as the current position is out of an intersection; and
    parking area entry determining part responsive to said turn-round signal generated when said out-of-intersection signal exists for determining that the vehicle has entered into a parking area to generate a parking area entry signal.

2. A car navigation apparatus according to claim 1, wherein said out-of-intersection detecting part detects that said intersection region does not exist within an estimated error in a forward and a backward direction with respect to the current position.

3. A car navigation apparatus according to claim 1, wherein said parking area entry determining part determines whether or not the vehicle is currently running at a predetermined speed or lower as one condition for the parking area entry determination.

4. A car navigation apparatus according to claim 1, further comprising:
    a parking area entry determining part for detecting entry of the vehicle into a road region near the current position while said parking area entry signal exists, to generate a parking area exit signal.

5. A car navigation apparatus according to claim 4, wherein said parking area exit determining part determines whether or not the vehicle is currently running at a predetermined speed or higher as one condition for determination of exit from the parking area.

6. A car navigation apparatus according to claim 4, wherein said parking area exit determining part determines whether or not said vehicle runs straight on as one condition for parking area exit condition.

7. A car navigation apparatus according to claim 1, wherein said out-of-intersection detecting part includes a component which calculates error distances in forward and backward directions based on a distance traveled from a last map matching point to a current position, said map-matching point being produced when the vehicle passes an intersection or makes a right turn or a left turn.

8. A car navigation apparatus according to claim 7, wherein said out-of-intersection detecting part judges that said current position is outside an intersection when a summed value of the error distance in the forward direction and a width of an intersection ahead of the vehicle is shorter than a distance between said intersection and the current position of the vehicle.

9. A car navigation apparatus according to claim 7, wherein said out-of-intersection detecting part judges that said current position is outside an intersection when a summed value of the error distance in the backward direction and a width of an intersection behind the vehicle is shorter than a distance between said intersection and the current position of the vehicle.

10. A car navigation apparatus according to claim 1, further comprising a parking area exit determining part comprising a component which calculates an error distance in a left or right direction of the vehicle based on a straight travel distance within the parking area to a current position.

11. A car navigation apparatus according to claim 10, wherein said parking area exit determining part determines that the vehicle has exited the parking area when a summed value of said error distance and a distance from the current position to a road near the vehicle extending in parallel is equal to or greater than a distance from the current position to said road near the vehicle.

* * * * *

UNITED STATES PATENT AND TRADEMARK OFFICE
CERTIFICATE OF CORRECTION

PATENT NO. : 6,640,188 B2
DATED : October 28, 2003
INVENTOR(S) : Hashida, M.

It is certified that error appears in the above-identified patent and that said Letters Patent is hereby corrected as shown below:

Column 8,
Line 57, "entry" should be -- exit --

Signed and Sealed this

Twenty-third Day of March, 2004

JON W. DUDAS
*Acting Director of the United States Patent and Trademark Office*